US012645482B2

(12) United States Patent
Tsirkin

(10) Patent No.: US 12,645,482 B2
(45) Date of Patent: Jun. 2, 2026

(54) ENABLING COMMUNICATION BETWEEN VIRTUAL MACHINES AND VIRTUAL DEVICES BY HYPERVISOR-CONTROLLED FIRMWARE

(71) Applicant: Red Hat, Inc., Raleigh, NC (US)

(72) Inventor: Michael Tsirkin, Yokneam Illit (IL)

(73) Assignee: Red Hat, LLC, Raleigh, NC (US)

( * ) Notice: Subject to any disclaimer, the term of this patent is extended or adjusted under 35 U.S.C. 154(b) by 508 days.

(21) Appl. No.: 18/120,965

(22) Filed: Mar. 13, 2023

(65) Prior Publication Data

US 2023/0221982 A1     Jul. 13, 2023

Related U.S. Application Data

(63) Continuation-in-part of application No. 16/943,556, filed on Jul. 30, 2020, now Pat. No. 11,604,673.

(51) Int. Cl.
G06F 9/455 (2018.01)

(52) U.S. Cl.
CPC .................... G06F 9/45558 (2013.01); G06F 2009/45583 (2013.01); G06F 2009/45595 (2013.01)

(58) Field of Classification Search
CPC ....... G06F 9/45558; G06F 2009/45583; G06F 2009/45587; G06F 2212/151; G06F 2212/657; G06F 12/1408; G06F 12/145; G06F 12/109
See application file for complete search history.

(56) References Cited

U.S. PATENT DOCUMENTS

| | | | | |
|---|---|---|---|---|
| 8,539,222 B2 | 9/2013 | Ashok | | |
| 9,021,476 B1 | 4/2015 | Pratt | | |
| 9,300,640 B2 | 3/2016 | Pate | | |
| 2016/0164880 A1 | 6/2016 | Colesa | | |
| 2016/0170900 A1* | 6/2016 | Hildesheim | ......... | G06F 12/1036 711/206 |
| 2016/0179696 A1* | 6/2016 | Zmudzinski | ........ | G06F 12/1009 711/163 |

(Continued)

FOREIGN PATENT DOCUMENTS

EP          2907071 A1     8/2015

OTHER PUBLICATIONS

AMD SEV-SNP: Strengthening VM Isolation With Integrity Protection and More, Jan. 2020, 20 pages.

(Continued)

*Primary Examiner* — Dong U Kim
(74) *Attorney, Agent, or Firm* — Dority & Manning, P.A.

(57) ABSTRACT

Systems and methods for encryption support for virtual machines. An example method may comprise initializing, by a firmware module associated with a virtual machine running on a host computer system, an exclusion range register associated with the virtual machine with a value specifying a first portion of guest memory. The first portion of the guest memory may include an exclusion range marked as reserved. The second portion of the guest memory may b e encrypted using an ephemeral encryption key. Virtual machine firmware may identify, in the second portion of the guest memory, an instruction to a virtual device associated with the virtual machine, copy data corresponding to the instruction to the first portion of guest memory, and alert the hypervisor of the data stored in the first portion of guest memory.

20 Claims, 8 Drawing Sheets

(56) References Cited

U.S. PATENT DOCUMENTS

| | | | |
|---|---|---|---|
| 2016/0246649 A1* | 8/2016 | Tsirkin | G06F 8/654 |
| 2017/0031810 A1* | 2/2017 | Bonzini | G06F 12/023 |
| 2017/0288874 A1* | 10/2017 | Narendra Trivedi | |
| | | | G06F 9/45533 |
| 2019/0065756 A1 | 2/2019 | Tsirkin | |
| 2019/0087575 A1* | 3/2019 | Sahita | G06F 21/71 |
| 2020/0057664 A1* | 2/2020 | Durham | G06F 21/53 |
| 2020/0285589 A1* | 9/2020 | Imbrenda | G06F 12/1408 |
| 2020/0310972 A1 | 10/2020 | Shanbhogue | |
| 2021/0200858 A1* | 7/2021 | Caspi | G06F 21/6218 |
| 2021/0232693 A1 | 7/2021 | Leenstra | |
| 2022/0206842 A1* | 6/2022 | Sahita | G06F 21/53 |

OTHER PUBLICATIONS

Morbitzer, "Extracting Secrets from Encrypted Virtual Machines", Jan. 7, 2019, 10 pages https://arxiv.org/abs/1901.01759.
Stroud, "Shielded VMs", QuinStreet Inc., 2020, 6 pages https://www.webopedia.com/TERM/S/shielded-vm.html.
Lee, "VMware vSphere Virtual Machine Encryption Configuration", Vembu Technologies, Feb. 5, 2019, 15 pages https://www.vembu.com/blog/vmware-vsphere-virtual-machine-encryption-configuration/.

* cited by examiner

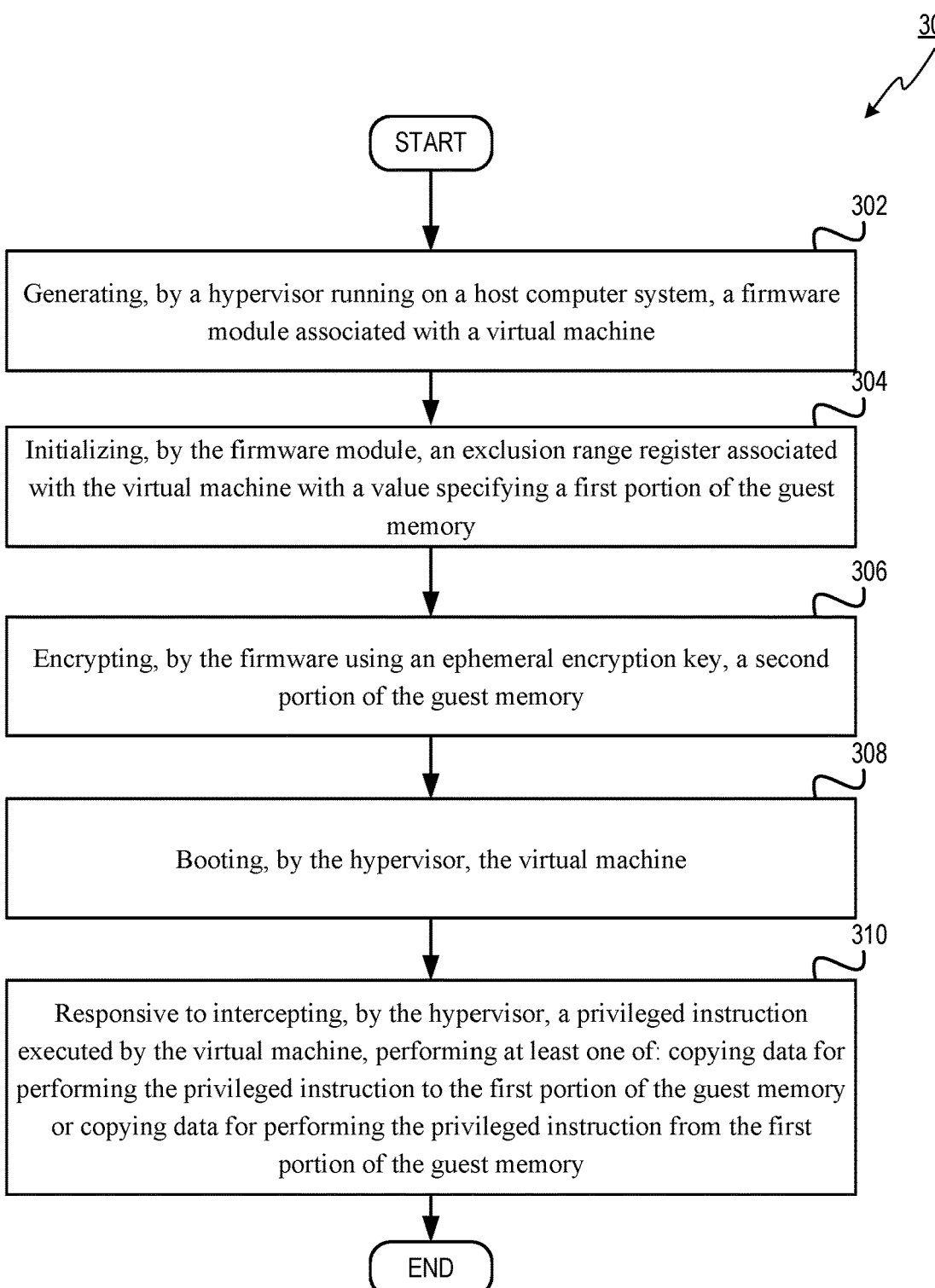

300

START

302
Generating, by a hypervisor running on a host computer system, a firmware module associated with a virtual machine 304
Initializing, by the firmware module, an exclusion range register associated with the virtual machine with a value specifying a first portion of the guest memory 306
Encrypting, by the firmware using an ephemeral encryption key, a second portion of the guest memory 308
Booting, by the hypervisor, the virtual machine 310
Responsive to intercepting, by the hypervisor, a privileged instruction executed by the virtual machine, performing at least one of: copying data for performing the privileged instruction to the first portion of the guest memory or copying data for performing the privileged instruction from the first portion of the guest memory

END

FIG. 3

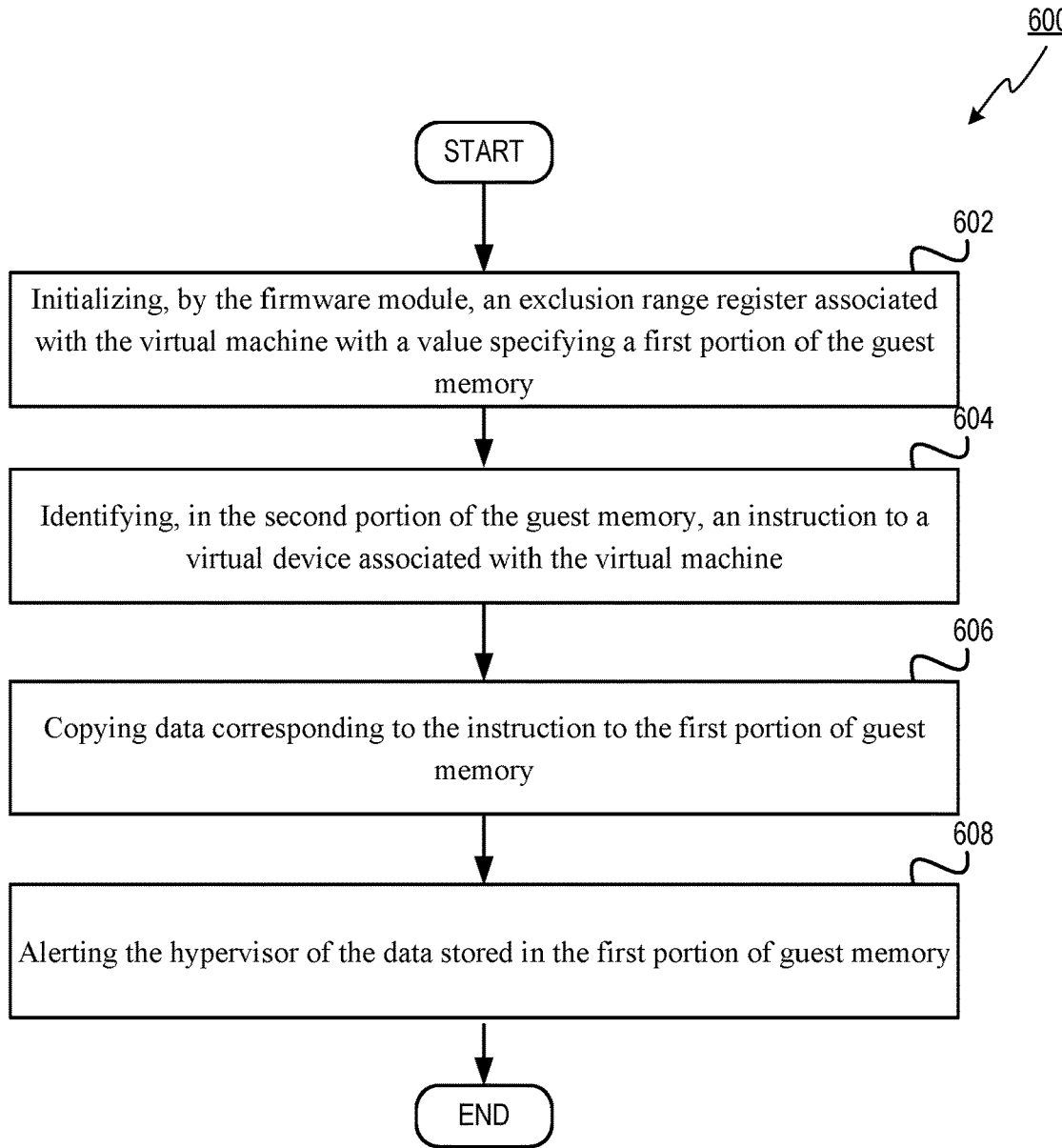

600

START

602

Initializing, by the firmware module, an exclusion range register associated with the virtual machine with a value specifying a first portion of the guest memory

604

Identifying, in the second portion of the guest memory, an instruction to a virtual device associated with the virtual machine

606

Copying data corresponding to the instruction to the first portion of guest memory

608

Alerting the hypervisor of the data stored in the first portion of guest memory

END

FIG. 6

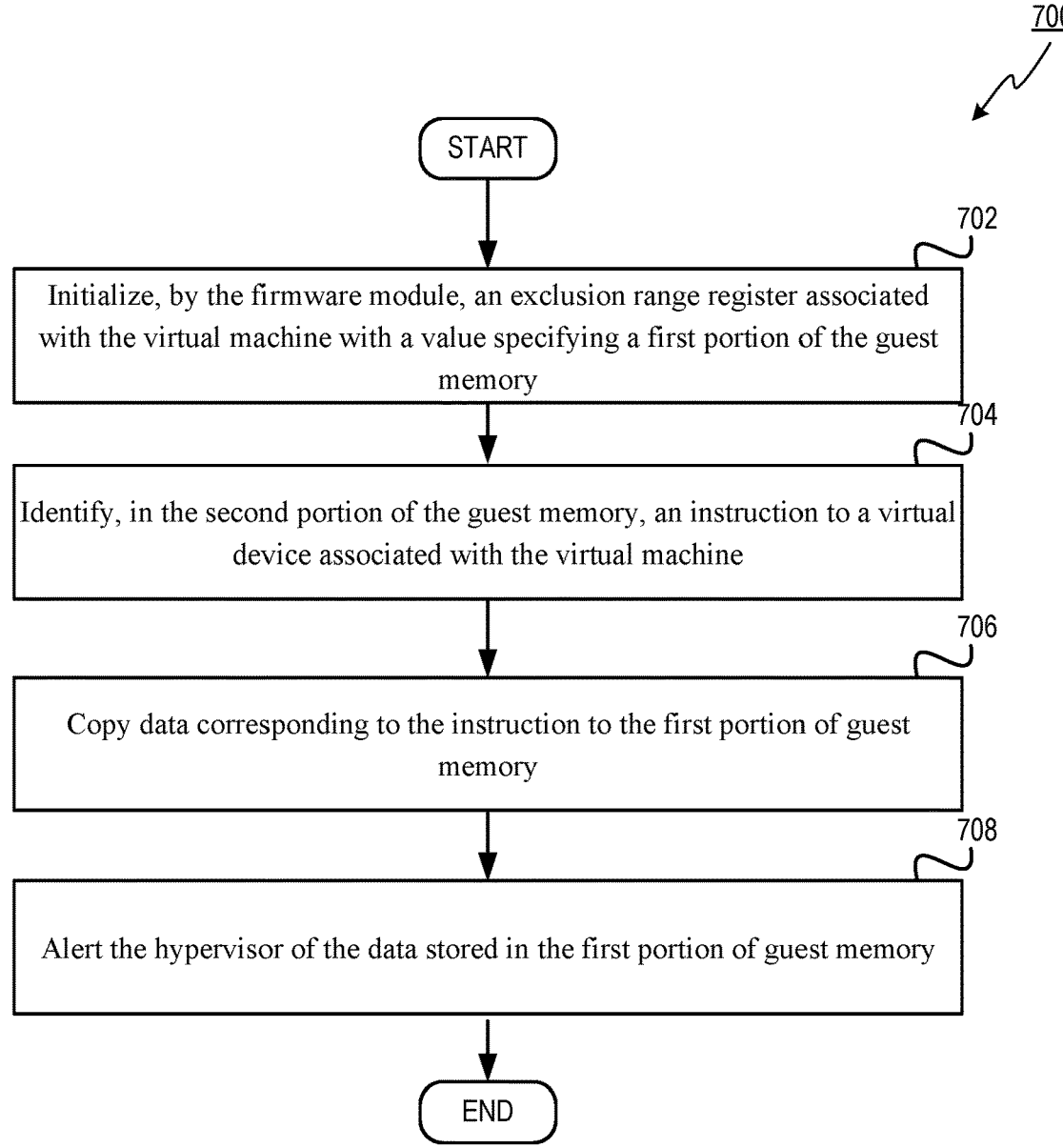

700

702

Initialize, by the firmware module, an exclusion range register associated with the virtual machine with a value specifying a first portion of the guest memory

704

Identify, in the second portion of the guest memory, an instruction to a virtual device associated with the virtual machine

706

Copy data corresponding to the instruction to the first portion of guest memory

708

Alert the hypervisor of the data stored in the first portion of guest memory

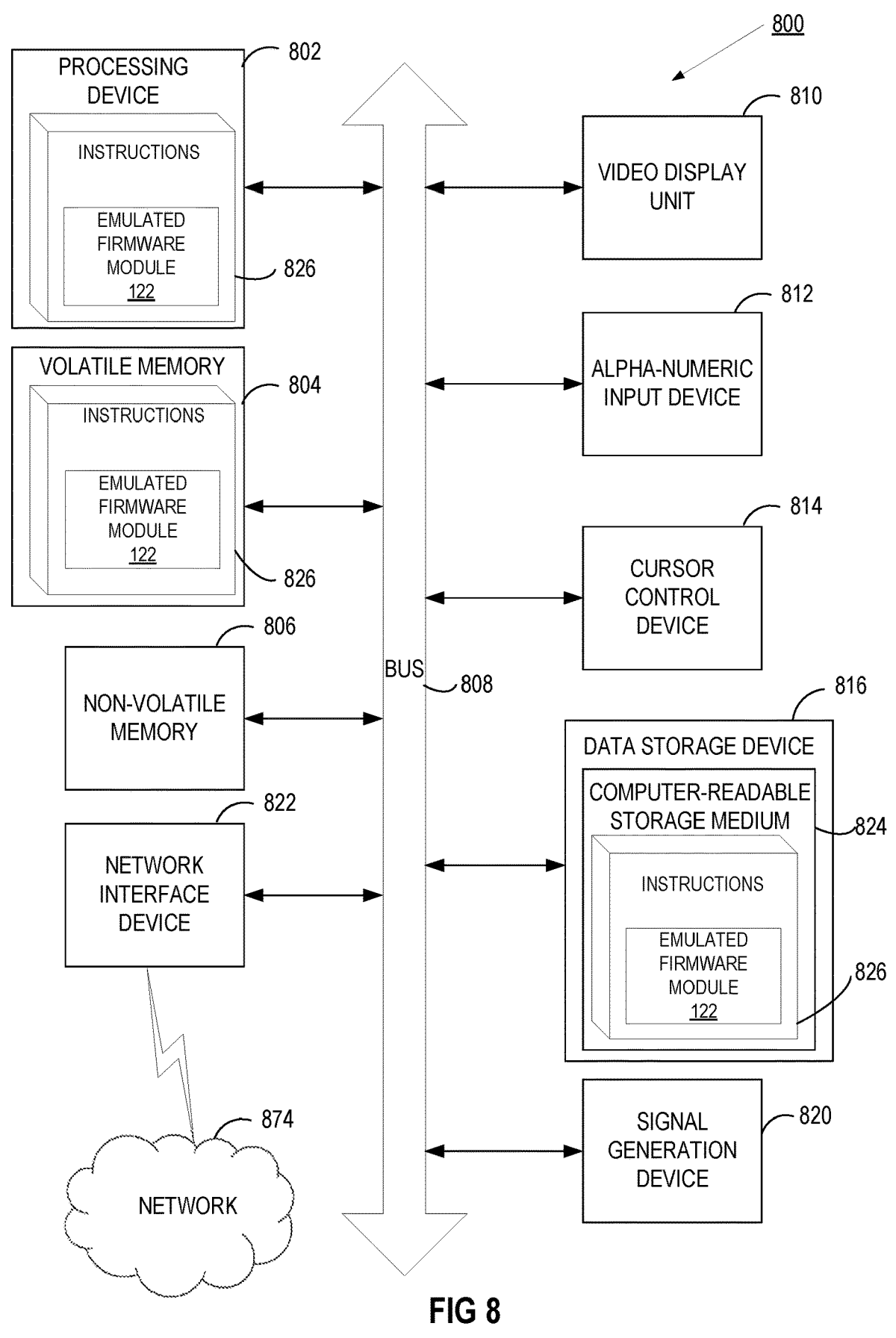

PROCESSING DEVICE 802

INSTRUCTIONS

EMULATED FIRMWARE MODULE 122

826

VOLATILE MEMORY 804

INSTRUCTIONS

EMULATED FIRMWARE MODULE 122

826

NON-VOLATILE MEMORY 806

NETWORK INTERFACE DEVICE 822

NETWORK 874

BUS 808

VIDEO DISPLAY UNIT 810

ALPHA-NUMERIC INPUT DEVICE 812

CURSOR CONTROL DEVICE 814

DATA STORAGE DEVICE 816

COMPUTER-READABLE STORAGE MEDIUM 824

INSTRUCTIONS

EMULATED FIRMWARE MODULE 122

826

SIGNAL GENERATION DEVICE 820

FIG 8

ENABLING COMMUNICATION BETWEEN VIRTUAL MACHINES AND VIRTUAL DEVICES BY HYPERVISOR-CONTROLLED FIRMWARE

RELATED APPLICATION

This application is a continuation-in-part of U.S. patent application Ser. No. 16/943,556, filed Jul. 30, 2020, entitled "MEMORY ENCRYPTION FOR VIRTUAL MACHINES BY HYPERVISOR-CONTROLLED FIRMWARE" issued as U.S. Pat. No. 11,604,673 on Mar. 14, 2023, the entire content of which is hereby incorporated by reference.

TECHNICAL FIELD

The present disclosure is generally related to virtualized computer systems, and more particularly, to memory encryption for virtual machines by hypervisor-controlled firmware, and to enabling communication between virtual machines and virtual devices by hypervisor-controlled firmware.

BACKGROUND

Virtualization herein shall refer to abstraction of some physical components into logical objects in order to allow running various software modules, for example, multiple operating systems, concurrently and in isolation from other software modules, on one or more interconnected physical computer systems. Virtualization allows, for example, consolidating multiple physical servers into one physical server running multiple virtual machines (also referred to herein as "guests" running on a host computer system) in order to improve the hardware utilization rate.

Virtualization may be achieved by running a software layer, often referred to as "hypervisor," above the hardware and below the virtual machines. A hypervisor may run directly on the server hardware without an operating system beneath it or as an application running under a traditional operating system. A hypervisor may abstract the physical layer and present this abstraction to virtual machines to use, by providing interfaces between the underlying hardware and virtual devices of virtual machines.

Processor virtualization may be implemented by the hypervisor scheduling time slots on one or more physical processors for a virtual machine, rather than a virtual machine actually having a dedicated physical processor. Memory virtualization may be implemented by employing a page table (PT) which is a memory structure translating virtual memory addresses to physical memory addresses. Device and input/output (I/O) virtualization involves managing the routing of I/O requests between virtual devices and the shared physical hardware.

BRIEF DESCRIPTION OF THE DRAWINGS

The present disclosure is illustrated by way of examples, and not by way of limitation, and may be more fully understood with references to the following detailed description when considered in connection with the figures, in which:

FIG. 3 depicts a flow diagram of an example method for creating a guest encrypted virtual machine by hypervisor-controlled firmware, in accordance with one or more aspects of the present disclosure;

FIG. 6 depicts a flow diagram of an example method for performing communication between an encrypted virtual machine and a virtual device, in accordance with one or more aspects of the present disclosure;

FIG. 7 depicts a flow diagram of another example method for performing communication between an encrypted virtual machine and a virtual device, in accordance with one or more aspects of the present disclosure; and FIG. 8 depicts a block diagram of an illustrative computing device operating in accordance with the examples of the present disclosure.

DETAILED DESCRIPTION

Figure 1:
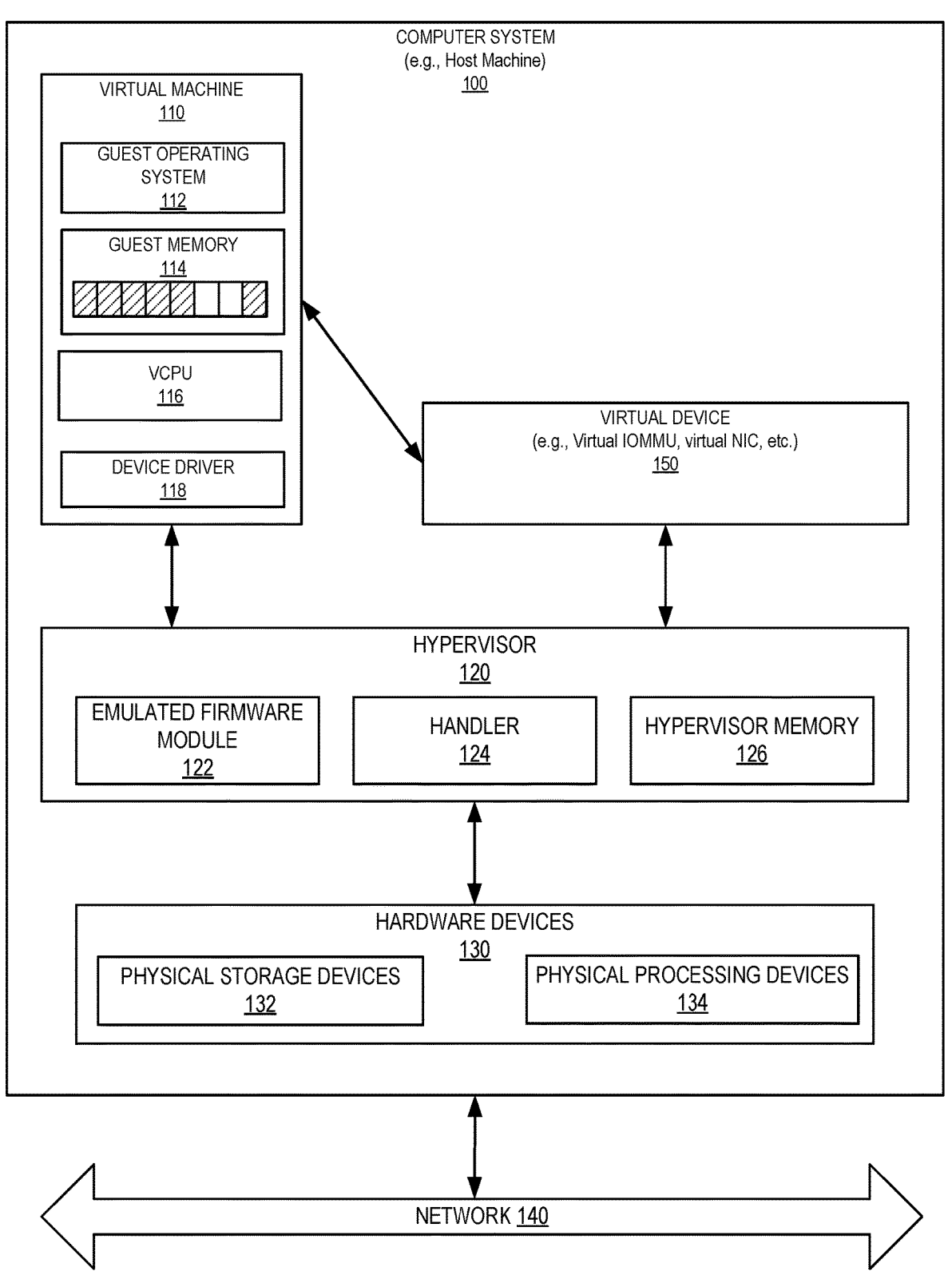
FIG. 1 depicts a high-level block diagram of an example host computer system that performs encryption support for virtual machines, in accordance with one or more aspects of the present disclosure.

Described herein are systems and methods for memory encryption for virtual machines by hypervisor-controlled firmware. Modern computer systems use trusted execution environments (TEEs) to enhance the isolation of data of a computing process from other processes executing on the computer system. A trusted execution environment may use hardware-based encryption to encrypt the data of a lower privileged process so that higher privileged computing processes would not have access to the data in an unencrypted form. This enables a lower privileged process to isolate its data from the higher privileged processes even though the higher privileged processes may be responsible for managing the data. In one example, one or more TEEs may be implemented using Software Guard eXtensions® (SGX) provided by Intel®, Memory Encryption Technology provided by AMD® (e.g., Secure Encrypted Virtualization® (SEV), Secure Memory Encryption (SME, SME-ES), Trust-Zone® provided by ARM®, other technology, or a combination thereof.

Encrypted virtual machine memory is a technology supported by TEEs, in which the guest memory of the virtual machine is protected from the hypervisor by means of encryption. In some implementations, the virtual machine can control which memory is encrypted by means of marking memory pages as unencrypted or encrypted in guest-controlled guest page tables, which can be used by a virtual central processing unit (vCPU) for translation of guest virtual addresses to guest physical addresses. The guest physical addresses may then be translated by the host-to-host physical addresses. An encryption key for each memory page of the encrypted memory may be performed using, for example, a random number and the location of the memory page (e.g., a host physical address).

However, this type of guest-driven encryption requires modifying the virtual machine, which may result in degraded performance. An alternative includes hypervisor-driven encryption, where the hypervisor can control which memory pages are encrypted by means of marking the memory pages as unencrypted or encrypted in host-controlled host page tables. Although this allows for guest to remain unmodified, issues emerge when the hypervisor is malicious or vulnerable. As such, it is desirable to run encrypted unmodified guests having protection from malicious and vulnerable hypervisors.

Furthermore, when virtual machines use virtual devices, a portion of the guest memory is used by the virtual machine for communication with the virtual devices. A virtual device may include software, implemented by the hypervisor, that emulates a physical device. The virtual device may thus be treated as a device on a user software level, but is generated by the hypervisor kernel without reference to hardware. An example of a virtual device includes virtual input/output memory management units (IOMMUs), virtual network interface controllers (vNICs) and virtual switches, etc. Since the virtual devices are implemented by the hypervisor, the hypervisor may need access to the portion of guest memory for memory writing or reading operations (e.g., memory access operations) related to the virtual device. For example, the hypervisor may access the portion of guest memory to write, into the guest memory, data received by the virtual device (e.g., a virtual network interface controller (vNIC)), or to read, from the guest memory, data to be sent to the virtual device. However, if the virtual machine memory is encrypted, the hypervisor is unable to access the portion of encrypted guest memory for memory writing or reading operations related to the virtual device. Rather, the virtual machine would need to reserve specific portions of shared memory for use with the virtual device, thus exposing the virtual machine to malicious and vulnerable hypervisors.

Aspects of the present disclosure address the above and other deficiencies by implementing encrypted virtual machine support for unmodified guests. To allow running unmodified guests while still protecting guests from a malicious or a compromised hypervisor, the encryption can be handed by the guest using hypervisor-supplied firmware. In particular, the hypervisor may generate an emulated firmware module, which, when invoked by a virtual machine during its boot sequence, would store, in a dedicated exclusion range register, one or more exclusion address ranges that specify respective guest memory buffers to be left unencrypted for supporting guest-hypervisor communications. The firmware would then mark the guest memory buffers specified by the exclusion ranges as reserved, thus preventing the virtual machine from overwriting the contents of those memory buffers upon boot. The firmware would encrypt the remaining guest memory using an ephemeral (i.e., CPU-provided) encryption key, and would allow the virtual machine to continue with the boot process. In some implementations, remaining guest memory may be encrypted by the CPU. the After the virtual machine has completed the boot, the hypervisor may utilize the unencrypted memory buffers for communicating with the virtual machine. In an illustrative example, the hypervisor may intercept a privileged instruction which the virtual machine attempts to execute. Upon intercepting the privileged instruction, the hypervisor may transfer the execution control to a handler that copies to and/or from an unencrypted memory buffer the data necessary to perform the privileged instruction. Examples of privileged instructions include loading or storing control registers, loading or storing model-specific registers, loading an interrupt descriptor table, or invalidate a page entry in the translation look-aside buffer. The address and contents of the exclusion range register, the address of the handler, and the address and contents of one or more control environments (e.g., page tables) can be reflected by a measurement (e.g., a cryptographic hash function) that is sent by the hypervisor to the owner of the virtual machine before boot, thus allowing verification of the integrity of the virtual execution environment.

In some implementations, the firmware may generate an interface to enable communication between the encrypted virtual machine and a virtual device. To generate the interface, the emulated firmware module may include an identifier of the virtual device. The identifier may include a location of the virtual device, a location of the configuration file corresponding to the virtual device, etc. During the boot sequence, for communications between the virtual machine and the virtual device, the firmware module may generate one interface to communicate with the virtual machine, and another interface to communicate with the virtual device (e.g., with the hypervisor).

To communicate with the virtual device, the virtual machine may store data (e.g., an instruction) in a particular location on the encrypted guest memory reserved for communicating with the virtual device. In some implementations, the virtual machine may consider the particular location as a particular register of the virtual device reserved to receive instructions. Storing the data may trigger a trap operation by the firmware. A trap operation causes an exception (e.g., an anomalous or exceptional condition requiring special processing) when a certain action (e.g., reading a register) is performed. The firmware may then copy the data from the encrypted guest memory to the shared memory, and alert the hypervisor (e.g., issue a hypercall). The hypervisor may then, via the virtual device, execute the instruction. To communicate with the virtual machine, the virtual device may, via the hypervisor, store data to the share memory location of the virtual machine. The firmware may then copy the data from the shared location to the encrypted guest memory, and alert the virtual machine.

Various aspects of the above referenced methods and systems are described in details herein below by way of examples, rather than by way of limitation. The examples provided below discuss a virtualized computer system where memory movement may be initiated by aspects of a hypervisor, a host operating system, a virtual machine, or a combination thereof. In other examples, the memory movement may be performed in a non-virtualized computer system that is absent a hypervisor or other virtualization features discussed below.

FIG. 1 depicts an illustrative architecture of elements of a computer system 100, in accordance with an implementation of the present disclosure. It should be noted that other architectures for computer system 100 are possible, and that the implementation of a computing device utilizing implementations of the disclosure are not necessarily limited to the specific architecture depicted. Computer system 100 may be a single host machine or multiple host machines arranged in a cluster and may include a rackmount server, a workstation, a desktop computer, a notebook computer, a tablet computer, a mobile phone, a palm-sized computing device, a personal digital assistant (PDA), etc. In one example, computing device 100 may be a computing device implemented with x86 hardware. In another example, computing device 100 may be a computing device implemented with PowerPC®, SPARC®, or other hardware. In the example shown in FIG. 1, computing device 100 may include virtual machine 110, hypervisor 120, hardware devices 130, a network 140, and virtual device 150.

Virtual machine(s) 110 may execute guest executable code that uses an underlying emulation of the physical resources. The guest executable code may include a guest operating system, guest applications, guest device drivers, etc. Virtual machine 110 may support hardware emulation, full virtualization, para-virtualization, operating system-level virtualization, or a combination thereof. Virtual machine 110 may have the same or different types of guest operating systems, such as Microsoft®, Windows®, Linux®, Solaris®, etc. Virtual machine 110 may execute guest operating system 112 that manage guest memory 114 and virtual central processing unit (vCPU) 116 respectively.

Device driver 118 may be any type of virtual or physical device driver, such as, for example, a vCPU driver. In some implementations, device driver 118 may be utilized for communicating with virtual device 150. The features provided by device driver 118 may be integrated into the operations performed by guest operating system 112. The features of device driver 118 are discussed in more detail below in regards to the computer system of FIG. 2.

Guest memory 114 may be any virtual memory, logical memory, physical memory, other portion of memory, or a combination thereof for storing, organizing, or accessing data. Guest memory 114 may represent the portion of memory that is designated by hypervisors 120 for use by one or more respective virtual machine 110. Guest memory 114 may be managed by guest operating system 112 and may be segmented into guest pages. The guest pages may each include a contiguous or non-contiguous sequence of bytes or bits and may have a page size that is the same or different from a memory page size used by hypervisor 120. Each of the guest page sizes may be a fixed-size, such as a particular integer value (e.g., 4 KB, 2 MB) or may be a variable-size that varies within a range of integer values.

Hypervisor memory 126 (e.g., host memory) may be the same or similar to the guest memory but may be managed by hypervisor 120 instead of a guest operating system. Hypervisor memory 126 may be segmented into host pages, which may be in different states. The states may correspond to unallocated memory, memory allocated to guests, and memory allocated to hypervisor(s). The unallocated memory may be host memory pages and guest memory pages that have not yet been allocated by hypervisor memory 126 or were previously allocated by hypervisor 120 and have since been deallocated (e.g., freed) by hypervisor 120. The memory allocated to guests may be a portion of hypervisor memory 126 that has been allocated by hypervisor 120 to virtual machine 110 and corresponds to guest memory of virtual machine 114. Other portions of hypervisor memory may be allocated for use by hypervisor 120, a host operating system, hardware device, other module, or a combination thereof.

Hypervisor 120 may also be known as a virtual machine monitor (VMM) and may provide virtual machine 110 with access to one or more features of the underlying hardware devices 130. In the example shown, hypervisor 120 may run directly on the hardware of computer system 100 (e.g., bare metal hypervisor). In other examples, hypervisor 120 may run on or within a host operating system (not shown). Hypervisor 120 may manage system resources, including access to hardware devices 130, and may manage execution of virtual machine 110 on a host machine. This includes provisioning resources of a physical central processing unit ("CPU") to virtual machine 110 running on the host machine. Provisioning the physical CPU resources may include associating one or more vCPUs 116 with each respective virtual machine 110. VCPU 116 may be provisioned by a core of the physical host CPU or a number of time slots reserved from one or more cores of the physical host CPU. VCPU 116 may be implemented by an execution thread that is scheduled to run on a physical host CPU. Software executing in virtual machine 110 may operate with reduced privileges such that hypervisor 120 retains control over resources. Hypervisor 120 retains selective control of the processor resources, physical memory, interrupt management, and input/output ("I/O"). In the example shown, hypervisor 120 may include a guest initialization component 122 and firmware handler 124. Emulated firmware module 122 and handler 124 may enable vCPU 116 to create, by a guest, an encrypted virtual machine. Emulated firmware module 122 and handler 124 may each be separated into one or more components or may be included within the same component, and are discussed in more detail below in regards to FIG. 2.

Hypervisor 120 may create a virtual device 150 and expose the virtual device 150 to virtual machine 110 via an appropriate virtual device driver 118. The virtual device 150 may have no associated hardware, and the functionality of the virtual device may be implemented by the hypervisor module that communicated with the virtual device driver 118. Virtual machine 110 may invoke the device driver 118 to communicate with the virtual device.

Hardware devices 130 may provide hardware resources and functionality for performing computing tasks. Hardware devices 130 may include one or more physical storage devices 132, one or more physical processing devices 134, other computing devices, or a combination thereof. One or more of hardware devices 130 may be split up into multiple separate devices or consolidated into one or more hardware devices. Some of the hardware device shown may be absent from hardware devices 130 and may instead be partially or completely emulated by executable code.

Physical storage devices 132 may include any data storage device that is capable of storing digital data and may include volatile or non-volatile data storage. Volatile data storage (e.g., non-persistent storage) may store data for any duration of time but may lose the data after a power cycle or loss of power. Non-volatile data storage (e.g., persistent storage) may store data for any duration of time and may retain the data beyond a power cycle or loss of power. In one example, physical storage devices 132 may be physical memory and may include volatile memory devices (e.g., random access memory (RAM)), non-volatile memory devices (e.g., flash memory, NVRAM), and/or other types of memory devices. In another example, physical storage devices 132 may include one or more mass storage devices, such as hard drives, solid state drives (SSD)), other data storage devices, or a combination thereof. In a further example, physical storage devices 132 may include a combination of one or more memory devices, one or more mass storage devices, other data storage devices, or a combination thereof, which may or may not be arranged in a cache hierarchy with multiple levels.

Physical processing devices 134 may include one or more processors that are capable of executing the computing tasks. Physical processing devices 134 may be a single core processor that is capable of executing one instruction at a time (e.g., single pipeline of instructions) or may be a multi-core processor that simultaneously executes multiple instructions. The instructions may encode arithmetic, logical, or I/O operations. In one example, physical processing devices 134 may be implemented as a single integrated circuit, two or more integrated circuits, or may be a component of a multi-chip module (e.g., in which individual microprocessor dies are included in a single integrated circuit package and hence share a single socket). A physical processing device may also be referred to as a central processing unit ("CPU").

Network 140 may be a public network (e.g., the internet), a private network (e.g., a local area network (LAN), a wide area network (WAN)), or a combination thereof. In one example, network 140 may include a wired or a wireless infrastructure, which may be provided by one or more wireless communications systems, such as a wireless fidelity (WiFi) hotspot connected with the network 140 and/or a wireless carrier system that can be implemented using various data processing equipment, communication towers, etc.

Figure 2:
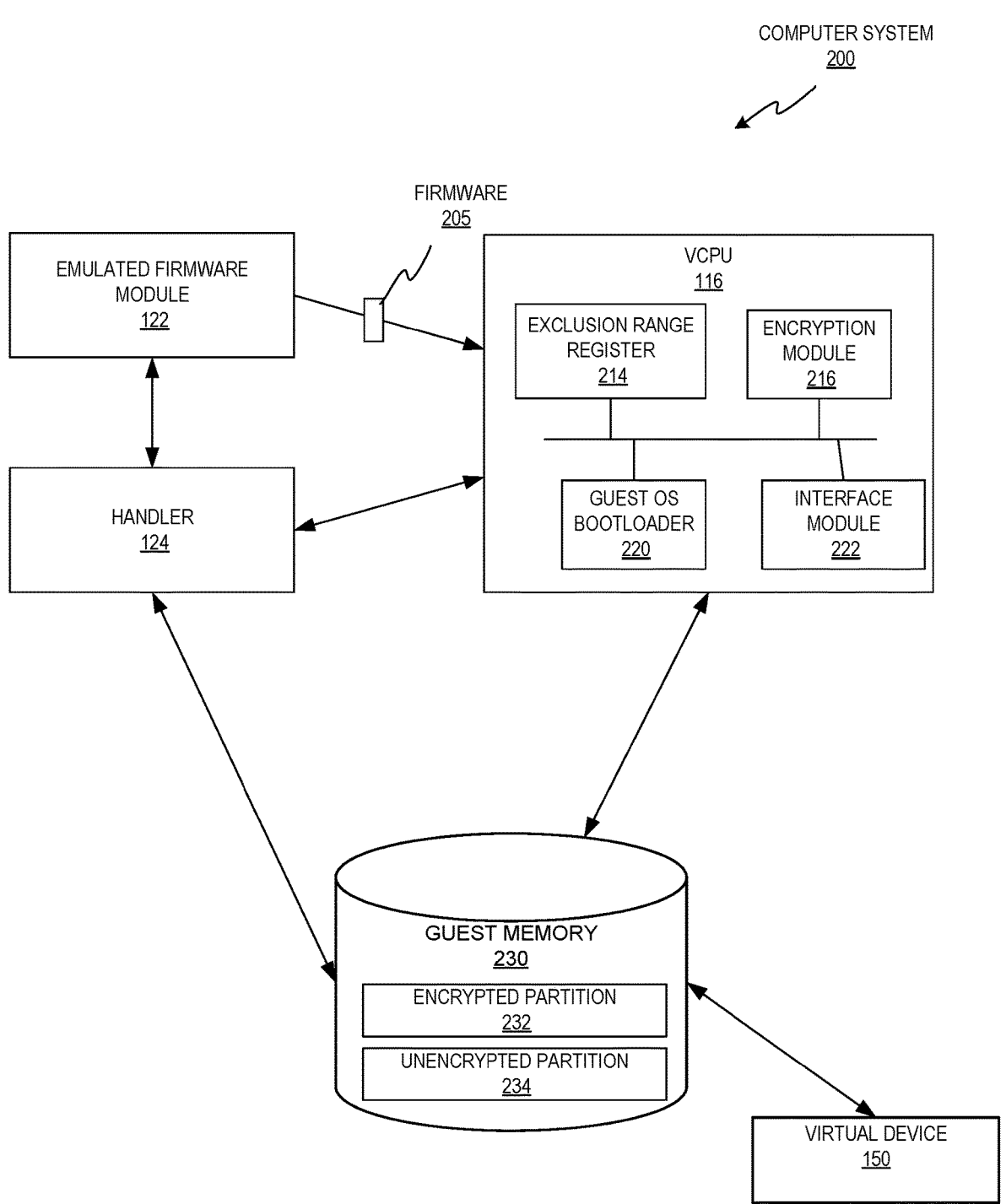
FIG. 2 depicts a block diagram illustrating components and modules of an example computer system, in accordance with one or more aspects of the present disclosure.

FIG. 2 is a block diagram illustrating example components and modules of computer system 200, in accordance with one or more aspects of the present disclosure. Computer system 200 may comprise executable code that implements one or more of the components and modules and may be implemented within a hypervisor, a host operating system, a guest operating system, hardware firmware, or a combination thereof. In the example shown, computer system 200 may include vCPU 116, emulated firmware module 122, handler 124, guest memory 230, and virtual device 150. VCPU 116 may include exclusion range register 214, encryption module 216, guest OS bootloader 220, and interface module 222.

VCPU 116 may initiate a boot sequence for a virtual machine (e.g., virtual machine 110) and invoke emulated firmware module 122. The emulated firmware module 122 may be generated by the hypervisor. Emulated firmware module 122 may send firmware 205 to vCPU 116 for execution. Specifically, emulated firmware module 122 may first initialize exclusion range register 214. Emulated firmware module 122 may store in exclusion range register 214 one or more exclusion address ranges that specify respective guest memory buffers to be left unencrypted (e.g., unencrypted partition 234) for supporting guest-hypervisor communications. Firmware 205 may then mark unencrypted partition 234 as reserved (e.g., read-only), to prevent the virtual machine from overwriting the contents of unencrypted partition 234 upon boot. Exclusion range register 214 may be a memory type range register (MTRR), an address-range register (ARR), or any other type of control register added to a CPU or vCPU that may b e used as a control mechanism to provide system software with control of how accesses to memory ranges by vCPU 116 are cached. Exclusion range register 214 may use a set of programmable model-specific registers (MSRs).

Encryption module 216, via firmware 205, may encrypt a portion of the guest memory 230 (e.g., encrypted partition 232) using a cryptographic key. In particular, encryption module 216 may encrypt the remaining portion of guest memory 230. In an example, encryption module 216 may encrypt the guest memory pages in encrypted partition 232 using Secure Memory Encryption (SME). Specifically, marked guest memory pages may be decrypted and encrypted during a read process or a write process. The guest memory pages may b e encrypted using a cryptographic key (e.g., a single 128-bit ephemeral AES key) which may be created randomly using a hardware random generator at each boot of the computer system. In another example, all of the guest memory pages in encrypted partition 232 may be encrypted using Transparent SME (TSME). In yet another example, the guest memory pages in the encrypted partition 232 may be encrypted and decrypted using Secure Encrypted Virtualization (SEV). The cryptographic key may be sent to a guest owner of the virtual machine (e.g., a server of an owner of the encrypted virtual machine).

Responsive to completion of the boot sequence, the hypervisor may utilize the unencrypted memory buffers (e.g., unencrypted partition 234) for communicating with the virtual machine. In an illustrative example, the hypervisor may intercept a privileged instruction which the virtual machine attempts to execute. Upon intercepting the privileged instruction, the hypervisor may transfer execution control to handler 124. Handler 124 may copy to and/or from an unencrypted memory buffer of unencrypted partition 234 the data necessary to perform the privileged instruction. Examples of privileged instructions include loading or storing control registers, loading or storing model-specific registers, loading an interrupt descriptor table, or invalidate a page entry in the translation look-aside buffer.

Prior to completion of the boot sequence, one or more of the address and contents of exclusion range register 214, the address of handler 124, and the address and contents of one or more control environments (e.g., page tables) can be reflected by a measurement (e.g., a cryptographic hash function) and sent by the hypervisor to the guest owner. This allows for verification of the integrity of the virtual execution environment. If the measurement is regarded as being correct, the guest owner can provide the cryptographic key to be used to start the encrypted virtual machine. The measurement may include any other code, data structures, a configuration, and/or information that can be loaded into guest memory and used to detect if any code configuration or data has been altered or corrupted.

In an example, the hypervisor may implement an attestation process to prove to the guest owner that the (encrypted) virtual machine may be securely launched with encrypted virtualization features enabled. During the attestation process, the guest owner may provide a guest image to the hypervisor. The hypervisor can generate a measurement using the guest image. As discussed above, the measurement may represent contents of guest memory 230 (e.g., the address and contents of exclusion range register 214, the address of handler 124, the address and contents of one or more control environments, etc. The hypervisor may pass the measurement to the guest owner. Upon receiving the measurement, the guest owner may determine whether the measurement is correct. If the measurement is regarded as being correct, the guest owner can provide the cryptographic key to be used to start the encrypted virtual machine and access the encrypted partition 232.

In an example, responsive to the measurement being regards as correct, the hypervisor may receive the cryptographic key from the guest owner, and firmware 205 may supply it to guest OS bootloader 220 through encrypted partition 232. Guest OS bootloader 220 may then boot the guest operating system and use the cryptographic key to access the encrypted partition 232.

In some implementations, the hypervisor may expose the emulated firmware module 122 to one or more virtual devices (e.g., virtual device 150) for use by the virtual machine. For example, the hypervisor may provide an identifier of the virtual device, a location of the virtual device in hypervisor memory, etc. In such implementations, during the boot sequence, interface module may generate a VM interface and a virtual device interface. Relating to communications between the virtual machine and the virtual device, the VM interface may be used to enable communication between the software of the virtual machine and the firmware of the virtual machine, while the virtual device interface may be used to enable communication between the firmware and the virtual machine. The VM interface may instruct the VM to communicate with the virtual device by reading data from and/or storing data to a specified portion of the encrypted partition 232. The virtual device interface may instruct the virtual device (or the hypervisor) to communicate with the virtual machine by reading data from and/or storing data to a specified portion of the unencrypted partition 234. During communication between the virtual machine and the virtual device, the interface module 222 may copy data from the specified portion of the encrypted partition 232 to the specified portion of the unencrypted partition 234, and vice versa.

To communicate with the virtual device, the virtual machine may store data in the particular portion of the encrypted partition 232. For example, the virtual machine may store an instruction, to the virtual device, in the encrypted partition 232. This may trigger a trap operation by interface module 222. Interface module 222 may then copy the data from the encrypted partition 232 to the particular portion of the unencrypted partition 234, and alert the hypervisor (e.g., via a hypercall). The hypervisor may then, via the virtual device, execute the instruction.

To communicate with the virtual machine, the virtual device may, via the hypervisor, store data in the particular portion of the unencrypted partition 234. Interface module 222 may then copy the data from the unencrypted partition 234 to the particular portion of the encrypted partition 232, and alert the virtual machine.

FIG. 3 depicts a flow diagram of an illustrative example of a method 300 for creating a guest encrypted virtual machine by hypervisor-controlled firmware, in accordance with one or more aspects of the present disclosure. Method 300 and each of its individual functions, routines, subroutines, or operations may be performed by one or more processors of the computer device executing the method. In certain implementations, method 300 may be performed by a single processing thread. Alternatively, method 300 may be performed by two or more processing threads, each thread executing one or more individual functions, routines, subroutines, or operations of the method. In an illustrative example, the processing threads implementing method 300 may be synchronized (e.g., using semaphores, critical sections, and/or other thread synchronization mechanisms). Alternatively, the processes implementing method 300 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 300 may be performed by a kernel of a hypervisor as shown in FIG. 1 or by an executable code of a host machine (e.g., host operating system or firmware), a virtual machine (e.g., guest operating system or virtual firmware), other executable code, or a combination thereof.

Method 300 may be performed by processing devices of a server device or a client device and may begin at block 302. At block 302, a hypervisor running on a host computer system may generate a firmware module associated with a virtual machine.

At block 304, the firmware module may initialize an exclusion range register associated with the virtual machine with a value specifying a first portion of the guest memory. In an implementation, firmware from the firmware module may allocate an exclusion range of the guest memory and mark it as reserved (e.g., read-only).

At block 306, the firmware may encrypt, using a cryptographic key, a second portion of the guest memory. The second portion of the guest memory may include all guest memory except for the first portion. In an example, the guest memory pages in the second portion of guest memory may be encrypted using SME. The cryptographic key may be a single 128-bit ephemeral AES key, which may be created randomly using a hardware random generator at each boot of the computer system. In another example, all of the guest memory pages in the in the second portion of guest memory may be encrypted using TSME. In yet another example, the guest memory pages in the second portion of guest memory may be encrypted and decrypted using SEV. The cryptographic key may be sent to the guest owner.

At block 308, the hypervisor may boot the virtual machine. At block 310, responsive to intercepting, by the hypervisor, a privileged instruction executed by the virtual machine, the hypervisor may perform at least one of: copying data for performing the privileged instruction to the first portion of the guest memory or copying data for performing the privileged instruction from the first portion of the guest memory.

In an implementation, the hypervisor may send a measurement reflecting a handler address, a control environment, and/or the exclusion range register to a guest owner. The measurement may be a cryptographic hash of one or more of the handler address, contents of the control environment, an address of the exclusion range register, and contents of the exclusion range register. The control environment may include a page table.

In another implementation, the hypervisor may receive the cryptographic key from a guest owner. The hypervisor may then supply, by the firmware, the cryptographic key to the virtual machine through the second portion of guest memory, and boot a guest operating system. Responsive to completing the operations described herein above with references to block 310, the method may terminate.

Figure 4:
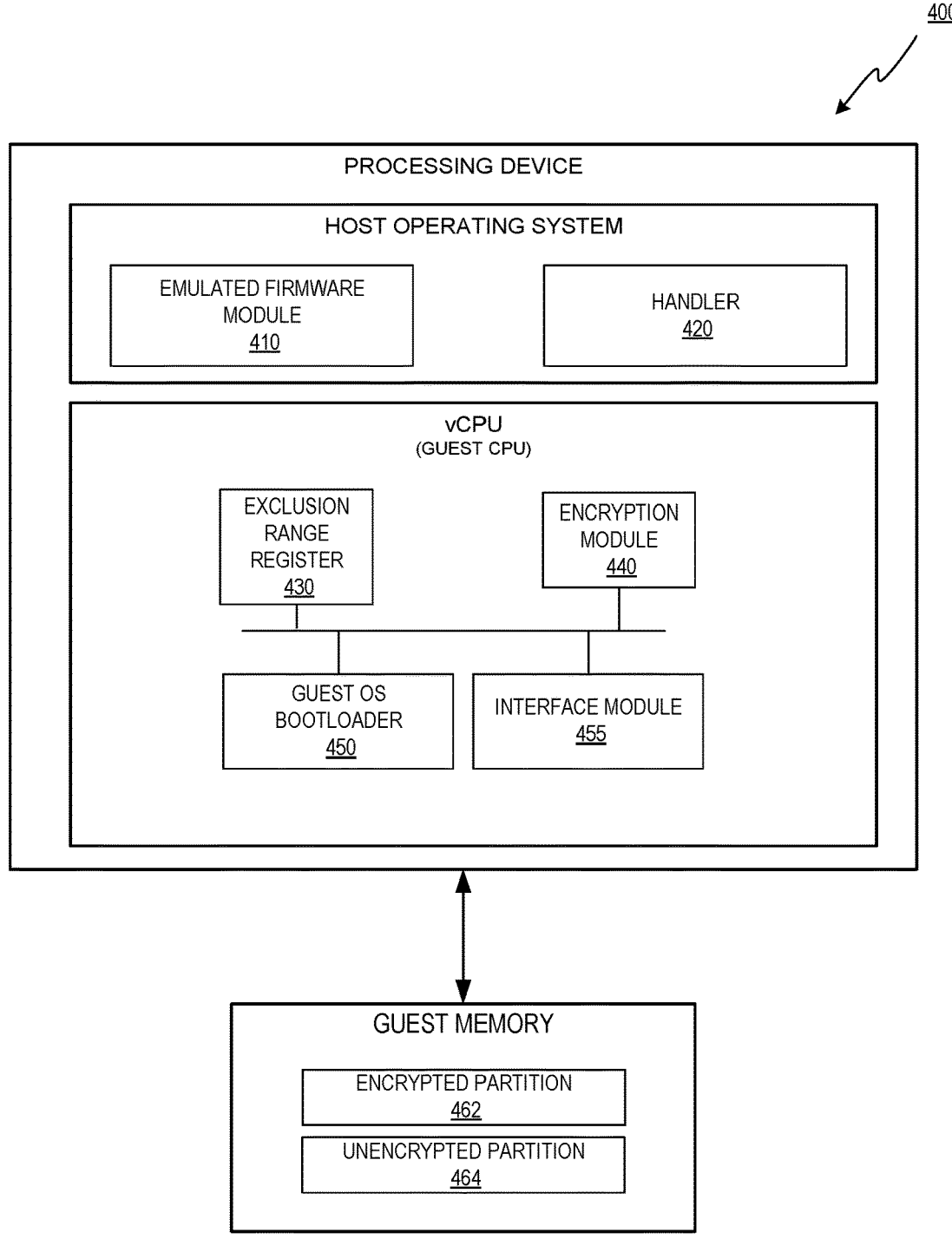
FIG. 4 depicts a block diagram of an example computer system in accordance with one or more aspects of the present disclosure.

FIG. 4 depicts a block diagram of a computer system 400 operating in accordance with one or more aspects of the present disclosure. Computer system 400 may b e the same or similar to computer system 200 and computing device 100 and may include one or more processing devices and one or more memory devices. In the example shown, computer system 500 may include emulated firmware module 410, handler 420, exclusion range register 430, encryption module 440, guest OS bootloader 450, interface module 455, encrypted partition 462, and unencrypted partition 464.

A hypervisor running on a host computer system may generate emulate firmware module 410 associated with a virtual machine. Emulated firmware module 410 may initialize exclusion range register 430 associated with the virtual machine with a value specifying a first portion of the guest memory. In an implementation, Emulated firmware module 410, via firmware, may allocate an exclusion range of the guest memory and mark it as reserved (e.g., read-only).

Encryption module 440, via the firmware, may encrypt a second portion of the guest memory using a cryptographic key. The second portion of the guest memory may include all guest memory except for the first portion. In an example, the guest memory pages in the second portion of guest memory may be encrypted using SME. The cryptographic key may be a single 128-bit ephemeral AES key, which may be created randomly using a hardware random generator at each boot of the computer system. In another example, all of the guest memory pages in the in the second portion of guest memory may be encrypted using TSME. In yet another example, the guest memory pages in the second portion of guest memory may be encrypted and decrypted using SEV. The cryptographic key may be sent to the guest owner.

The hypervisor may boot the virtual machine. Responsive to intercepting, by the hypervisor, a privileged instruction executed by the virtual machine, the hypervisor may transfer execution control to handler 420 to perform at least one of: copying data for performing the privileged instruction to the first portion of the guest memory or copying data for performing the privileged instruction from the first portion of the guest memory.

In an implementation, the hypervisor may send a measurement reflecting an address of handler 420, a control environment, and/or the exclusion range register to a guest owner. The measurement may be a cryptographic hash of one or more of the handler address, contents of the control environment, an address of the exclusion range register, and contents of the exclusion range register. The control environment may include a page table.

In another implementation, the hypervisor may receive the cryptographic key from a guest owner. The hypervisor may then supply, by the firmware, the cryptographic key to the guest OS bootloader 450 through the second portion of guest memory, and boot a guest operating system.

Interface module 455 may generate a first interface between virtual machine firmware and virtual machine software and generate a second interface between the virtual machine firmware and the virtual device. In some implementations, interface module 455 may identify, in the encrypted partition of the guest memory, an instruction to a virtual device associated with the virtual machine, copy data corresponding to the instruction to the unencrypted partition of guest memory, and alert the hypervisor of the data stored in the unencrypted partition of guest memory. Alerting the hypervisor may include performing a hypercall. In some implementations, the hypervisor may provide an identifier associated with the virtual device. In some implementations, detecting that the virtual machine programmed data to a portion of the encrypted partition may cause interface module 455 to trigger a trap operation.

Figure 5:
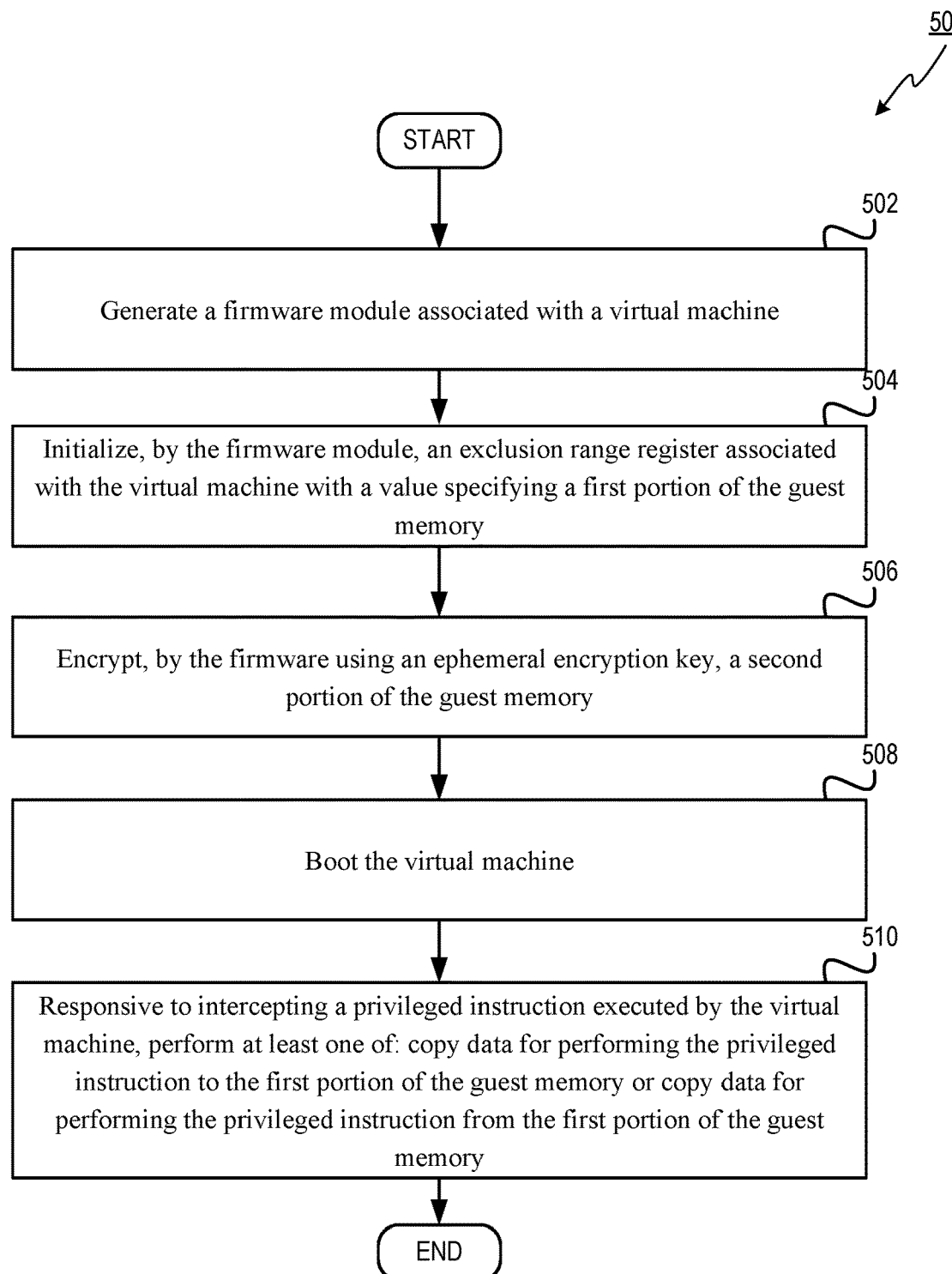
FIG. 5 depicts a flow diagram of another example method for creating a guest encrypted virtual machine by hypervisor-controlled firmware, in accordance with one or more aspects of the present disclosure.

FIG. 5 depicts a flow diagram of one illustrative example of a method 500 for creating a guest encrypted virtual machine by hypervisor-controlled firmware, in accordance with one or more aspects of the present disclosure. Method 500 may be similar to method 500 and may be performed in the same or a similar manner as described above in regards to method 500. Method 500 may be performed by processing devices of a server device or a client device and may begin at block 502.

In block 502, a processing device may generate a firmware module associated with a virtual machine. At block 504, the processing device, via the firmware module, may initialize an exclusion range register associated with the virtual machine with a value specifying a first portion of the guest memory. In an implementation, the firmware may allocate an exclusion range of the guest memory and mark it as reserved (e.g., read-only).

At block 506, the processing device, via the firmware, may encrypt, using a cryptographic key, a second portion of the guest memory. The second portion of the guest memory may include all guest memory except for the first portion. In an example, the guest memory pages in the second portion of guest memory may be encrypted using SME. The cryptographic key may be a single 128-bit ephemeral AES key, which may be created randomly using a hardware random generator at each boot of the computer system. In another example, all of the guest memory pages in the in the second portion of guest memory may be encrypted using TSME. In yet another example, the guest memory pages in the second portion of guest memory may be encrypted and decrypted using SEV. The cryptographic key may be sent to the guest owner.

At block 508, the processing device may boot the virtual machine. At block 510, responsive to intercepting, by the processing device, a privileged instruction executed by the virtual machine, the processing device may perform at least one of: copy data for performing the privileged instruction to the first portion of the guest memory or copy data for performing the privileged instruction from the first portion of the guest memory.

In an implementation, the processing device may send a measurement reflecting a handler address, a control environment, and/or the exclusion range register to a guest owner. The measurement may be a cryptographic hash of one or more of the handler address, contents of the control environment, an address of the exclusion range register, and contents of the exclusion range register. The control environment may include a page table.

In another implementation, the processing device may receive the cryptographic key from a guest owner. The processing device may then supply, by the firmware, the cryptographic key to the virtual machine through the second portion of guest memory, and boot a guest operating system. Responsive to completing the operations described herein above with references to block 510, the method may terminate.

FIG. 6 depicts a flow diagram of one illustrative example of a method 600 for performing communication between an encrypted virtual machine and a virtual device, in accordance with one or more aspects of the present disclosure. Method 600 may be similar to method 600 and may be performed in the same or a similar manner as described above in regards to method 600. Method 600 may be performed by processing devices of a server device or a client device and may begin at block 602.

At block 602, a firmware module may initialize an exclusion range register associated with a virtual machine with a value specifying a first portion of the guest memory. In an implementation, a hypervisor running on a host computer system may generate the firmware module associated with the virtual machine. In an implementation, firmware from the firmware module may allocate an exclusion range of the guest memory and mark it as reserved (e.g., read-only). The firmware and/or hardware (e.g., a CPU) may encrypt, using a cryptographic key, a second portion of the guest memory. The second portion of the guest memory may include all guest memory except for the first portion. In an example, the guest memory pages in the second portion of guest memory may be encrypted using SME. The cryptographic key may b e a single 128-bit ephemeral AES key, which may be created randomly using a hardware random generator at each boot of the computer system. In another example, all of the guest memory pages in the in the second portion of guest memory may be encrypted using TSME. In yet another example, the guest memory pages in the second portion of guest memory may be encrypted and decrypted using SEV. The cryptographic key may be sent to the guest owner. In some implementations, the host computer system may then initiate execution of the virtual machine. Responsive to receiving a privileged instruction, the host computer system may perform a memory access operation respective to the first portion of guest memory.

In some implementations, the firmware may generate a first interface between virtual machine firmware and virtual machine software and generate a second interface between the virtual machine firmware and the virtual device. The hypervisor may provide, to the firmware module, an identifier associated with the virtual device.

At block 604, firmware of the virtual machine may identify, in the second portion of the guest memory, an instruction to a virtual device associated with the virtual machine. In an example, the virtual machine may program, to the second portion of the guest memory, the data corresponding to the instruction, which may trigger the virtual machine firmware to execute a trap operation.

At block 606, the firmware may copy data corresponding to the instruction to the first portion of guest memory.

At block 608, the firmware may alert the hypervisor of the data stored in the first portion of guest memory. Alerting the hypervisor may include performing, by firmware of the virtual machine, a hypercall. In some implementations, the firmware may identify in the first portion of the guest memory, a response to the instruction and copy data corresponding to the response to the second portion of guest memory.

FIG. 7 depicts a flow diagram of one illustrative example of a method 700 for performing communication between an encrypted virtual machine and a virtual device, in accordance with one or more aspects of the present disclosure. Method 700 may be similar to method 700 and may be performed in the same or a similar manner as described above in regards to method 700. Method 700 may be performed by processing devices of a server device or a client device and may begin at block 702.

At block 702, processing logic may, via a firmware module, initialize an exclusion range register associated with the virtual machine with a value specifying a first portion of the guest memory. In an implementation, the processing logic may allocate an exclusion range of the guest memory and mark it as reserved (e.g., read-only). The firmware and/or hardware (e.g., a CPU) may encrypt, using a cryptographic key, a second portion of the guest memory. The second portion of the guest memory may include all guest memory except for the first portion. In an example, the guest memory pages in the second portion of guest memory may be encrypted using SME. The cryptographic key may be a single 128-bit ephemeral AES key, which may b e created randomly using a hardware random generator at each boot of the computer system. In another example, all of the guest memory pages in the in the second portion of guest memory may be encrypted using TSME. In yet another example, the guest memory pages in the second portion of guest memory may be encrypted and decrypted using SEV. The cryptographic key may be sent to the guest owner. In some implementations, the host computer system may then initiate execution of the virtual machine. Responsive to receiving a privileged instruction, the host computer system may perform a memory access operation respective to the first portion of guest memory.

In some implementations, the processing logic may generate a first interface between virtual machine firmware and virtual machine software and generate a second interface between the virtual machine firmware and the virtual device. The hypervisor may provide, to the firmware module, an identifier associated with the virtual device.

At block 704, the processing logic may identify, in the second portion of the guest memory, an instruction to a virtual device associated with the virtual machine. In an example, the virtual machine may program, to the second portion of the guest memory, the data corresponding to the instruction, which may trigger the virtual machine firmware to execute a trap operation.

At block 706, the processing logic may copy data corresponding to the instruction to the first portion of guest memory.

At block 708, the processing logic may alert the hypervisor of the data stored in the first portion of guest memory. Alerting the hypervisor may include performing a hypercall. In some implementations, the processing logic may identify in the first portion of the guest memory, a response to the instruction and copy data corresponding to the response to the second portion of guest memory.

FIG. 8 depicts a block diagram of a computer system operating in accordance with one or more aspects of the present disclosure. In various illustrative examples, computer system 800 may correspond to computing device 100 of FIG. 1 or computer system 200 of FIG. 2. The computer system may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a computing device to translate these requests to the underlying physical computing hardware resources. This type of virtualization results in multiple VMs sharing physical resources.

In certain implementations, computer system 800 may be connected (e.g., via a network, such as a Local Area Network (LAN), an intranet, an extranet, or the Internet) to other computer systems. Computer system 800 may operate in the capacity of a server or a client computer in a client-server environment, or as a peer computer in a peer-to-peer or distributed network environment. Computer system 800 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 800 may include a processing device 802, a volatile memory 804 (e.g., random access memory (RAM)), a non-volatile memory 806 (e.g., read-only memory (ROM) or electrically-erasable programmable ROM (EEPROM)), and a data storage device 816, which may communicate with each other via a bus 808.

Processing device 802 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 800 may further include a network interface device 822. Computer system 800 also may include a video display unit 810 (e.g., an LCD), an alphanumeric input device 812 (e.g., a keyboard), a cursor control device 814 (e.g., a mouse), and a signal generation device 820.

Data storage device 816 may include a non-transitory computer-readable storage medium 824 on which may store instructions 826 encoding any one or more of the methods or functions described herein, including instructions for implementing methods 300 or 500 and for emulated firmware module 122, handler 124 (not shown), and modules illustrated in FIGS. 1 and 2.

Instructions 826 may also reside, completely or partially, within volatile memory 804 and/or within processing device 802 during execution thereof by computer system 800, hence, volatile memory 804 and processing device 802 may also constitute machine-readable storage media.

While computer-readable storage medium 824 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "initiating," "transmitting," "receiving," "analyzing," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general-purpose computer system selectively programmed by a computer program stored in the computer system. Such a computer program may be stored in a computer-readable tangible storage medium.

The methods and illustrative examples described herein are not inherently related to any particular computer or other apparatus. Various general-purpose systems may be used in accordance with the teachings described herein, or it may prove convenient to construct more specialized apparatus to perform methods 300 or 500 and one or more of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:

initializing, by a firmware module associated with a virtual machine running on a host computer system, an exclusion range register associated with the virtual machine with a value specifying a first portion of a guest memory to be left unencrypted for guest-hypervisor communications between the virtual machine and a hypervisor, wherein the first portion of the guest memory comprises an exclusion range marked as reserved such that the hypervisor has access to the first portion of the guest memory, wherein a second portion of the guest memory is encrypted using an ephemeral encryption key such that the hypervisor does not have access to the second portion of the guest memory;

identifying, in the second portion of the guest memory, an instruction to a virtual device associated with the virtual machine;

copying data, the data corresponding to the instruction, to the first portion of the guest memory; and alerting the hypervisor of the data stored in the first portion of the guest memory.

2. The method of claim 1, further comprising:

initiating, by the host computer system, execution of the virtual machine; and responsive to receiving a privileged instruction, performing a memory access operation respective to the first portion of the guest memory.

3. The method of claim 1, wherein alerting the hypervisor comprises performing, by firmware of the virtual machine, a hypercall.

4. The method of claim 1, wherein the hypervisor provides, to the firmware module, an identifier associated with the virtual device.

5. The method of claim 1, further comprising:

generating a first interface between virtual machine firmware and virtual machine software, the virtual machine firmware and the virtual machine software associated with the virtual machine; and generating a second interface between the virtual machine firmware and the virtual device.

6. The method of claim 1, further comprising:

copying, by the virtual machine, to the second portion of the guest memory, the data corresponding to the instruction; and executing, by virtual machine firmware, a trap operation.

7. The method of claim 1, further comprising:

identifying, in the first portion of the guest memory, a response to the instruction; and copying data corresponding to the response to the second portion of the guest memory.

8. A system, comprising:

a memory;

a processing device operatively coupled to the memory, the processing device configured to:

initialize, by a firmware module associated with a virtual machine running on a host computer system, an exclusion range register associated with the virtual machine with a value specifying a first portion of a guest memory to be left unencrypted for guest-hypervisor communications between the virtual machine and a hypervisor, wherein the first portion of the guest memory comprises an exclusion range marked as reserved such that the hypervisor has access to the first portion of the guest memory, wherein a second portion of the guest memory is encrypted using an ephemeral encryption key such that the hypervisor does not have access to the second portion of the guest memory;

identify, in the second portion of the guest memory, an instruction to a virtual device associated with the virtual machine;

copy data, the data corresponding to the instruction, to the first portion of the guest memory; and alert the hypervisor of the data stored in the first portion of the guest memory.

9. The system of claim 8, further comprising the processing device configured to:

initiate execution of the virtual machine; and responsive to receiving a privileged instruction, perform a memory access operation respective to the first portion of the guest memory.

10. The system of claim 8, wherein alerting the hypervisor comprises performing a hypercall.

11. The system of claim 8, wherein the hypervisor provides, to the firmware module, an identifier associated with the virtual device.

12. The system of claim 8, further comprising the processing device configured to:

generate a first interface between virtual machine firmware and virtual machine software, the virtual machine firmware and the virtual machine software associated with the virtual machine; and generate a second interface between the virtual machine firmware and the virtual device.

13. The system of claim 8, further comprising the processing device configured to:

copy, by the virtual machine, to the second portion of the guest memory, the data corresponding to the instruction; and execute, by virtual machine firmware, a trap operation.

14. The system of claim 8, further comprising the processing device configured to:

identify, in the first portion of the guest memory, a response to the instruction; and copy data corresponding to the response to the second portion of the guest memory.

15. A non-transitory machine-readable storage medium storing instructions that cause a processing device to:

initialize, by a firmware module associated with a virtual machine running on a host computer system, an exclusion range register associated with the virtual machine with a value specifying a first portion of a guest memory to be left unencrypted for guest-hypervisor communications between the virtual machine and a hypervisor, wherein the first portion of the guest memory comprises an exclusion range marked as reserved such that the hypervisor has access to the first portion of the guest memory, wherein a second portion of the guest memory is encrypted using an ephemeral encryption key such that the hypervisor does not have access to the second portion of the guest memory;

identify, in the second portion of the guest memory, an instruction to a virtual device associated with the virtual machine;

copy data, the data corresponding to the instruction, to the first portion of the guest memory; and alert the hypervisor of the data stored in the first portion of the guest memory.

16. The non-transitory machine-readable storage medium of claim 15, further comprising the processing device configured to:

initiate execution of the virtual machine; and responsive to receiving a privileged instruction, perform a memory access operation respective to the first portion of the guest memory.

17. The non-transitory machine-readable storage medium of claim 15, wherein alerting the hypervisor comprises performing a hypercall.

18. The non-transitory machine-readable storage medium of claim 15, wherein the hypervisor provides, to the firmware module, an identifier associated with the virtual device.

19. The non-transitory machine-readable storage medium of claim 15, further comprising the processing device configured to:

generate a first interface between virtual machine firmware and virtual machine software, the virtual machine firmware and the virtual machine software associated with the virtual machine; and generate a second interface between the virtual machine firmware and the virtual device.

20. The non-transitory machine-readable storage medium of claim 15, further comprising the processing device configured to:

copy, by the virtual machine, to the second portion of the guest memory, the data corresponding to the instruction; and execute, by virtual machine firmware, a trap operation.

* * * * *